United States Patent
Melchior et al.

(10) Patent No.: US 7,606,372 B2
(45) Date of Patent: Oct. 20, 2009

(54) DEVICE AND METHOD FOR DETERMINING A REPRODUCTION POSITION

(75) Inventors: Frank Melchior, Ilmenau (DE); Sandra Brix, Ilmenau (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1012 days.

(21) Appl. No.: 11/058,511

(22) Filed: Feb. 15, 2005

(65) Prior Publication Data

US 2005/0147257 A1    Jul. 7, 2005

Related U.S. Application Data

(63) Continuation of application No. PCT/EP2004/000463, filed on Jan. 21, 2004.

(30) Foreign Application Priority Data

Feb. 12, 2003 (DE) ................. 103 05 820

(51) Int. Cl.
    *H04R 5/00* (2006.01)
    *H04B 1/00* (2006.01)
    *G03B 31/00* (2006.01)

(52) U.S. Cl. ............... 381/18; 381/1; 381/119; 352/11; 352/12

(58) Field of Classification Search ........... 381/58, 381/17, 18, 119, 56, 1, 310, 307, 104, 92; 700/94; 352/11, 27, 37, 36, 12; 463/35
See application file for complete search history.

(56) References Cited

U.S. PATENT DOCUMENTS

| 4,179,713 | A | 12/1979 | Freudenschuss et al. |
| 5,778,082 | A | 7/1998 | Chu et al. |

(Continued)

FOREIGN PATENT DOCUMENTS

EP    0 592 652 A1    4/1994

(Continued)

OTHER PUBLICATIONS

Boone, M. M. et al.: "On the Applicability of Distributed Mode Loudspeaker Panels for Wave Field Synthesis Based Sound Reproduction", AES 108$^{th}$ Convention, Paris, Feb. 19-22, 2000, pp. 1-9.

(Continued)

*Primary Examiner*—Xu Mei
*Assistant Examiner*—Douglas J Suthers
(74) *Attorney, Agent, or Firm*—Laurence A. Greenberg; Werner H. Stemer; Ralph E. Locher

(57) ABSTRACT

A method and device are provided for determining a reproduction position of a source of sound for audio-visual reproduction of a film scene from a plurality of individual pictures with regard to a reproduction surface having a predetermined width, and with regard to a projection source having a projection reference point. A recording position of the source of sound, a camera position during recording, and an aperture angle of the camera during recording are obtained and the determined recording position is transformed to a camera coordinate system. A reproduction position for the source of sound is calculated and used to produce sound-source positioning in a reproduction room using wave-field synthesis methods.

22 Claims, 7 Drawing Sheets

U.S. PATENT DOCUMENTS 5,862,229 A * 1/1999 Shimizu ............... 381/17
2002/0103553 A1 8/2002 Phillips
2003/0118192 A1 6/2003 Sasaki

FOREIGN PATENT DOCUMENTS

WO 02/052897 A1 7/2002

OTHER PUBLICATIONS

De Bruijn, W. P. J. et al.: "Subjective Experiments on the Effects of Combining Spatialized Audio and 2D Video Projection in Audio-Visual Systems", Audio Engineering Society, Convention Paper 5582, Presented at the AES 112$^{th}$ Convention, Munich, Germany, May 10-13, 2002, pp. 1-11.

Berkhout, A. J. et al.: "Acoustic Control by Wave Field Synthesis", J. Acoustical Society of America, 93 (5), May 1993, pp. 2764-2778.

Reiter, U et al.: "Automatisierte Anpassung der Akustik an virtuelle Räume" [Automated Acoustic Synchronization in Virtual Rooms], 46th International Scientific Colloquium, Ilmenau Technical University, Sep. 24-27, 2001 pp. 25.

* cited by examiner (CALCULATING THE REPRODUCTION POSITION)

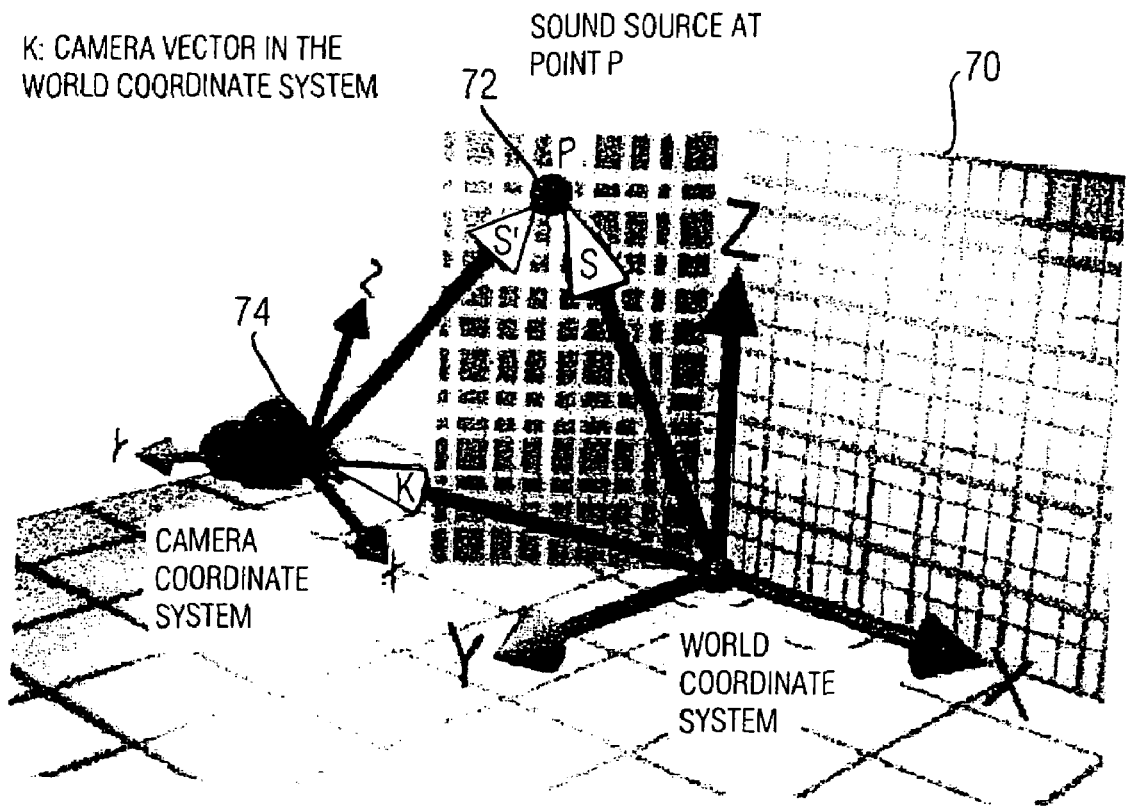

$$Rx = \begin{pmatrix} 1 & 0 & 0 \\ 0 & \cos(Tilt) & \sin(Tilt) \\ 0 & -\sin(Tilt) & \cos(Tilt) \end{pmatrix}$$

$$Ry = \begin{pmatrix} \cos(Roll) & 0 & -\sin(Roll) \\ 0 & 1 & 0 \\ \sin(Roll) & 0 & \cos(Roll) \end{pmatrix} \quad Rz = \begin{pmatrix} \cos(Pan) & \sin(Pan) & 0 \\ -\sin(Pan) & \cos(Pan) & 0 \\ 0 & 0 & 1 \end{pmatrix}$$

$$S' = S - K; \quad S'' = Rx \cdot Ry \cdot Rz \cdot S'$$

(LINEAR TRANSFORMATION)    (ROTATIONAL TRANSFORMATION)

FIGURE 7

DEVICE AND METHOD FOR DETERMINING A REPRODUCTION POSITION

CROSS-REFERENCE TO RELATED APPLICATION

This is a continuing application, under 35 U.S.C. § 120, of copending international application No. PCT/EP2004/000463, filed Jan. 21, 2004, which designated the United States; this application also claims the priority, under 35 U.S.C. § 119, of German patent application No. 103 05 820.6, filed Feb. 12, 2003; the prior applications are herewith incorporated by reference in their entirety.

BACKGROUND OF THE INVENTION

1. Field of the Invention

The present invention relates to audio reproduction techniques and, in particular, to audio reproduction techniques which are suitable for wave-field synthesis modules to conduct a source of sound positioning tuned to a video reproduction.

2. Description of Prior Art

There is an increasing need for new technologies and innovative products in the area of consumer electronics. It is an important prerequisite for the success of new multimedia systems to offer optimal functionalities or capabilities. This is achieved by the employment of digital technologies and, in particular, computer technology. Examples hereof are the applications offering an enhanced close-to-reality audiovisual impression. In previous audio systems, a substantial disadvantage has been the quality of the spatial sound reproduction of natural, but also of virtual environments.

Methods of multi-channel loudspeaker reproduction of audio signals have been known and standardized for many years. All common techniques have the disadvantage that both the site of the loudspeakers and the position of the listener are already impressed on the transfer format. With incorrect arrangement of the loudspeakers with reference to the listener, audio quality suffers significantly. Optimum sound is only possible in a small area of the reproduction space, the so-called sweet spot.

A better natural spatial impression as well as a more pronounced enclosure, or enveloping, with audio reproduction may be achieved with the aid of a new technology. The principles of this technology, the so-called wave-field synthesis (WFS), have been studied at the TU Delft and first presented in the late 80s (Berkhout, A. J.; de Vries, D.; Vogel, P.: Acoustic control by Wave-field Synthesis. JASA 93, 993).

Due to this method's enormous requirements for computer power and transfer rates, wave-field synthesis has up to now only rarely been employed in practice. Only the progress achieved in the areas of microprocessor technology and audio encoding today permit the employment of this technology in concrete applications. First products in the professional area are expected for next year. In a few years' time, first wave-field synthesis applications for the consumer area are also supposed to come on the market.

The basic idea of WFS is based on the application of Huygens' principle of the wave theory:

Each point caught by a wave is a starting point of an elementary wave propagating in a spherical or a circular manner.

Applied to acoustics, every arbitrary shape of an incoming wave front may be replicated by a large amount of loudspeakers arranged next to one other (a so called loudspeaker array). In the simplest case, which includes a single point source to be reproduced and a linear arrangement of the loudspeakers, the audio signals of each loudspeaker have to be fed with a time delay and amplitude scaling so that the radiated sound fields of the individual loudspeakers overlay correctly. With several sources of sound, for each source the contribution to each loudspeaker is calculated separately, and the resulting signals are added. If the sources to be reproduced are in a room with reflecting walls, reflections also have to be reproduced via the loudspeaker array as additional sources. Thus, the calculation expenditure highly depends on the number of sources of sound, the reflection properties of the recording room, and the number of loudspeakers.

In particular, the advantage of this technique is that a natural spatial sound impression across a great area of the reproduction space is possible. In contrast to the known techniques, direction and distance of sources of sound are reproduced in a very exact manner. To a limited degree, virtual sources of sound may even be positioned between the real loudspeaker array and the listener.

Although wave-field synthesis functions well for environments whose conditions are known, irregularities occur if the conditions change or if wave-field synthesis is executed on the basis of an environmental condition which does not match the actual condition of the environment.

The technique of wave-field synthesis, however, may also be advantageously employed to supplement a visual perception by a corresponding spatial audio perception. Previously, in the production in virtual studios, emphasis has been placed on conveying an authentic visual impression of the virtual scene. The acoustic impression matching the image is usually subsequently impressed on the audio signal by manual steps during so-called post-production, or is classified as too expensive and time-consuming in its implementation, and is thus neglected. Thereby, usually a contradiction of the individual sensual perceptions arises, which leads to the designed space, i.e. the designed scene, being perceived as less authentic.

In the specialist publication "Subjective experiments on the effects of combining spatialized audio and 2D video projection in audio-visual systems", W. de Bruijn and M. Boone, AES convention paper 5582, May 10 to 13, 2002, Munich, subjective experiments performed on the effects of combining spatial audio and a two-dimensional video projection in audio-visual systems are presented. It is emphasized, in particular, that two human speakers positioned almost one behind the other and at different distances from a camera, may be better understood by an observer if, by means of wave-field synthesis, the two persons, positioned one behind the other, are interpreted and reconstructed as different virtual sources of sound. In this case, subjective tests have revealed that it is easier for a listener to understand and differentiate between the two speakers, who are speaking at the same time, if they are separate from one another.

In a conference paper on the 46. international scientific colloquium in Ilmenau from Sep. 24 to 27, 2001, entitled "Automatisierte Anpassung der Akustik an virtuelle Raume", U. Reiter, F. Melchior and C. Seidel, an approach to automating sound post-processing methods is presented. To this end, the parameters of a film set which are required for visualization, such as the size of the room, the texture of the surfaces or the positions of the camera and of the actors, are checked as to their acoustic relevance, whereupon corresponding control data is generated. This data then influences, in an automated manner, the effect and post-processing methods employed for postproduction, such as the adjustment of the dependence of the speaker's loudness, or volume, on the distance from the camera, or the reverberation time in dependence on the size of the room and the nature of the walls. Here, the goal is to reinforce the visual impression of a virtual scene for enhanced perception of reality.

The intention is to enable "hearing with the ears of the camera" to make a scene appear more authentic. What is strived for here is to achieve as high a correlation as possible between the sound event location in the image and the hearing event location in the surround field. This means that sound-source positions are supposed to be constantly adjusted to an image. Camera parameters, such as zoom, are to be integrated into sound production just as much as positions of two loudspeakers L and R. For this purpose, tracking data of a virtual studio is written into a file along with an associated time code of the system. At the same time, image, sound and time code are recorded on an MAZ. The camdump file is transmitted to a computer, which generates control data for an audio workstation therefrom, which it outputs via a MIDI interface in synchronicity with the image stemming from the MAZ. The actual audio processing, such as positioning of the source of sound in the surround field, and introducing early reflections and reverberation is performed in the audio workstation.The signal is rendered for a 5.1 surround loudspeaker system.

With real film sets, camera tracking parameters as well as positions of sources of sound in the recording setting may be recorded. Such data may also be generated in virtual studios.

In a virtual studio, an actor or presenter is on his/her own in a recording room. In particular, he/she is standing before a blue wall, which is also referred to as blue box or blue panel. A pattern of blue and light-blue stripes is applied to this blue wall. What is special about this pattern is that the stripes have varying widths, and that therefore, a multitude of stripe combinations result. The unique stripe combinations on the blue wall make it possible, in post-processing, when the blue wall is replaced by a virtual background, to determine which direction the camera is pointed at. With the aid of this information, the computer may determine the background for the current camera's angle of view. In addition, sensors provided on the camera, which detect and output additional camera parameters, are also evaluated. Typical parameters of a camera which are detected by means of sensor technology, are the three degrees of translation, x, y, z, the three degrees of rotation, also referred to as roll, tilt, and pan, and the focal length, or the zoom, which is equivalent to the information about the aperture angle of the camera.

So that the precise position of the camera can be determined even without picture recognition and without costly sensor technology, a tracking system may also be employed which consists of several infrared cameras determining the position of an infrared sensor attached to the camera. Thus, the position of the camera is determined as well. By means of the camera parameters provided by the sensor technology, and by means of the stripe information evaluated by the picture recognition, a real-time computer may now calculate the background for the current picture. Subsequently, the shade of blue exhibited by the blue background is removed from the picture, so that the blue background is replaced by the virtual background.

In most cases, a concept is adhered to which is about getting an overall acoustic impression of the scenes visually portrayed. This may be paraphrased by the term of the "total" stemming from the field of picture configuration. This "total" sound impression mostly remains constant across all camera positionings in a scene, even though the optical angle of view of the objects strongly varies in most cases.

Thus, optical details may or may not be emphasized, depending on corresponding positionings. Countershots conducted in the creation of cinematic dialogs are not copied by the sound.

Therefore, there is a need to acoustically involve the audience into an audio-visual scene. Here, the screen, or image area, forms the viewer's line of vision and angle of view. This means that the sound is to follow the image such that it always matches the image viewed. This is becoming more important, in particular, for virtual studios, since there is typically no correlation between the sound of, e.g., the presentation, or moderation, and the surroundings the presenter finds himself/herself in. To get an overall audio-visual impression of the scene, a spatial impression matching the image rendered must be simulated. An essential subjective characteristic with such a tonal concept is, in this context, the location of a source of sound as is perceived by a viewer of, e.g., a cinema screen.

SUMMARY OF THE INVENTION

It is the object of the present invention to provide a concept for determining a reproduction position of a source of sound for audio-visual reproduction of a film scene, the concept efficiently providing a mapping of a sound-source position from recording to reproduction.

In accordance with a first aspect, the invention provides a device for determining a reproduction position of a source of sound for audio-visual reproduction of a film scene from a plurality of individual pictures with regard to a reproduction surface having a predetermined width and a projection source having a projection reference point, the device having:

a provider for providing a recording position of the source of sound, a camera position during recording, and an aperture angle of the camera during recording;

a transformer for transforming the recording position of the source of sound to a camera coordinate system, the origin of which is defined, in relation to a camera aperture, to obtain a recording position of the source of sound in the camera coordinate system;

a calculator for calculating the reproduction position of the source of sound in relation to the projection reference point, the calculator being configured to use the projection reference point and the camera aperture as a common starting point, and the calculator being operative, in the case of an aperture angle of the camera which equals a predetermined aperture angle, to calculate the reproduction position on the basis of an intersection point between a straight line extending through the recording position of the source of sound in the camera coordinate system and through the common starting point and the reproduction surface, or if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference.

In accordance with a second aspect, the invention provides a method for determining a reproduction position of a source of sound for audio-visual reproduction of a film scene from a plurality of individual pictures with regard to a reproduction surface having a predetermined width and a projection source having a projection reference point, the method including the following steps:

providing a recording position of the source of sound, a camera position during recording, and an aperture angle of the camera during recording;

transforming the recording position of the source of sound to a camera coordinate system, the origin of which is defined, in relation to a camera aperture, to obtain a recording position of the source of sound in the camera coordinate system;

calculating the reproduction position of the source of sound in relation to the projection reference point, the calculator being configured to use the projection reference point and the camera aperture as a common starting point, and the calculator being operative, in the case of an aperture angle of the camera which equals a predetermined aperture angle, to calculate the reproduction position on the basis of an intersection point between a straight line extending through the recording position of the source of sound in the camera coordinate system and through the common starting point and the reproduction surface, or if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference.

In accordance with a third aspect, the invention provides a computer program having a program code for performing the method for determining a reproduction position of a source of sound for audio-visual reproduction of a film scene from a plurality of individual pictures with regard to a reproduction surface having a predetermined width and a projection source having a projection reference point, the method including the following steps:

providing a recording position of the source of sound, a camera position during recording, and an aperture angle of the camera during recording;

transforming the recording position of the source of sound to a camera coordinate system, the origin of which is defined, in relation to a camera aperture, to obtain a recording position of the source of sound in the camera coordinate system;

calculating the reproduction position of the source of sound in relation to the projection reference point, the calculator being configured to use the projection reference point and the camera aperture as a common starting point, and the calculator being operative, in the case of an aperture angle of the camera which equals a predetermined aperture angle, to calculate the reproduction position on the basis of an intersection point between a straight line extending through the recording position of the source of sound in the camera coordinate system and through the common starting point and the reproduction surface, or if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference, when the program runs on a computer.

In accordance with a fourth aspect, the invention provides a device for reproducing, on a reproduction surface, a film scene having a plurality of individual pictures, having:

a provider for providing a reproduction position of a source of sound for audio-visual reproduction of a film scene from a plurality of individual pictures with regard to a reproduction surface having a predetermined width and a projection source having a projection reference point, the device having:

a provider for providing a recording position of the source of sound, a camera position during, recording and an aperture angle of the camera during recording;

a transformer for transforming the recording position of the source of sound to a camera coordinate system, the origin of which is defined, in relation to a camera aperture, to obtain a recording position of the source of sound in the camera coordinate system;

a calculator for calculating the reproduction position of the source of sound in relation to the projection reference point, the calculator being configured to use the projection reference point and the camera aperture as a common starting point, and the calculator being operative, in the case of an aperture angle of the camera which equals a predetermined aperture angle, to calculate the reproduction position on the basis of an intersection point between a straight line extending through the recording position of the source of sound in the camera coordinate system and through the common starting point and the reproduction surface, or if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference, a wave-field synthesis generator for generating control signals for one or several loudspeaker arrays to simulate a virtual reproduction position of the source of sound for a viewer positioned in an audience area.

The present invention is based on the findings that the camera coordinate system, i.e. the coordinate system in which the camera performs a recording in a virtual studio or in a real setting, may be amalgamated, as it were, with a reproduction coordinate system, which is represented by a reproduction surface, which may be a cinema screen, for example, and by a reproduction source, which may be, e.g., a film projector in a cinema, so as to provide a realistic sound-source positioning in the reproduction system on the basis of the recording system. What is of a vital importance here is that the zoom positioning of the camera is taken into account, when recording, with regard to the reproduction. In accordance with the invention, one assumes a standard zoom positioning, i.e. a standard aperture angle of the camera, which is preferably set to correspond to the aperture angle of the optical system of a viewer.

The human visual system exhibits a specific aperture angle which is about 27 degrees. The human eye is known to have no zoom function. The aperture angle of the eyes is therefore always predefined. If the aperture angle of the camera is set to correspond to the aperture angle of the human eye, i.e. if a 1:1 mapping of a recording scene in relation to a reproduction scene is obtained, all angles and distances are reproduced in an undistorted manner for an optimum viewpoint.

Moreover, in accordance with the invention, a projection sphere is defined which is preset by the horizontal standard aperture angle and a horizontal width dimension of the reproduction surface. If the zoom positioning of the camera equals the aperture angle of the reproduction system in the optimum viewpoint, the camera aperture is set to equal the projector aperture. If, on the other hand, the aperture angle of the camera is changed with regard to the standard aperture angle, the projector aperture and the camera aperture diverge.

It shall be pointed out here that the projector aperture does not at all need to equal the standard aperture of the human eye, or of the camera. If, for example, a projector having a smaller aperture angle is placed further away from the screen, this is to achieve that despite the smaller angle, the projector fills the entire screen, the size and position of which are normally predefined. The optimum viewpoint then moves away from the projector aperture and is positioned between the projector aperture and the screen. The exact optimum viewpoint turns out to be that place before the screen where a viewer is seated who has the standard aperture angle and is seeing the entire width of the screen, i.e. who has exactly the entire width of the screen in his/her aperture angle.

In accordance with the invention, a differentiation is made, in addition, whether a source of sound appears on a reproduction surface, i.e. may be viewed by a cinema viewer, or whether a source of sound is invisible. For example, if two persons are talking to each other, while the camera is directed at one of them, it is self-evident, for a realistic reproduction, that the other person must also be positioned as a source of sound, since even though in the overall audio-visual impression only one person is visible, the noises created by the other person, however, are also audible for the viewer. In accordance with the invention, in the case where a source of sound is visible, the calculation of the reproduction position is conducted on the basis of the position of the source of sound on the screen, whereas in the event that a source of sound is not visible, the calculation is performed on the basis of a position on the projection sphere so as to obtain the reproduction position.

The inventive concept is advantageous in that realistic sound-source positioning is achieved which, on the one hand, takes into account invisible, but audible sources of sound, and which, on the other hand, takes into account that the positioning of the aperture angle of the camera may deviate from the standard aperture angle.

In addition, the inventive concept is advantageous in that it may be automated using a computer, which contributes to enabling such as a system to run in real time and to thus gain wide-spread use.

A further advantage of the present invention is the fact that only readily available input data will be required. With a view to recording, these are a sound-source position in the recording setting, a camera position in the recording setting and an aperture angle of the camera. With a view to the reproduction circumstances, these are the width of a reproduction screen as well as, optionally, an aperture angle of a reproduction device, the aperture angle normally being predefined by the given technical facts of a reproduction device, the width of a reproduction surface and the distance between the reproduction surface and the reproduction source.

In accordance with the invention, exact positioning of sources of sound is thus achieved in a reproduction environment to adjust a reproduction scene to differing recording situations.

Eventually, the present invention is advantageous in that due to the two different cases which lead to a differentiation of a total of four cases, the sound-source positioning is transparent, flexible, low in expenditure, and, in particular with regard to taking into account various accuracy requirements, scalable.

There are various possibilities of how to deal with the interfaces with the screen or the projection sphere. For a calculation which is simple and may thus be performed at lower expenditure, the source of sound may be placed on the screen, or the projection sphere, without taking into account the length of the sound-source vector, in the case of the standard aperture angle. In the event of a deviating aperture angle, the distance and the difference may be calculated on the basis of this value.

For a calculation which is more accurate but requires a increased expenditure, the length of the sound-source vector is taken into account in the recording setting so as to place the source of sound before, or behind, the screen or projection sphere, even with an existing standard aperture angle of the camera, by scaling the vector to the point of intersection with the screen or sphere, to make its length identical with the sound-source vector from the camera setting. If the aperture angle of the camera deviates from the standard aperture angle, the reproduction position of the source of sound is shifted by the difference, starting from a position located before or behind the screen or sphere.

To enlarge the optimum viewpoint, the placement of the source of sound before or behind the screen, and/or the shifting of the source of sound may be performed in a nonlinear manner due to a zoom/wide-angle positioning, it being possible to also use thresholds in that shifting of the source of sound to before or behind the screen or projection sphere is admitted only up to a selectable maximum amount.

BRIEF DESCRIPTION OF THE DRAWINGS

Preferred embodiments of the present invention will be explained in detail below with reference to the accompanying figures, wherein:

FIG. 7 is a diagrammatic representation of the relationship between a world coordinate system and a camera coordinate system.

DESCRIPTION OF PREFERRED
EMBODIMENTS

Figure 1:
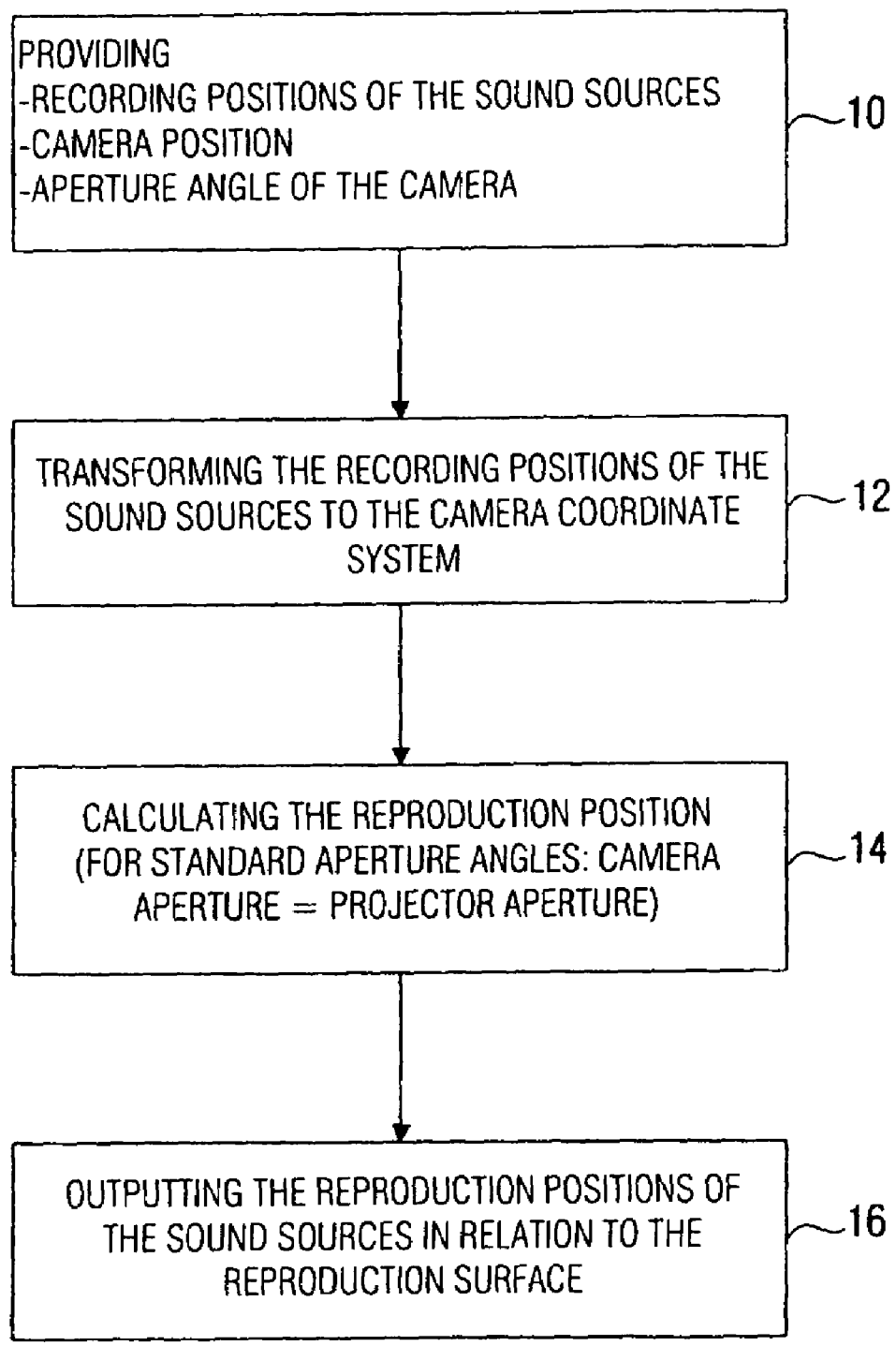
FIG. 1 is a block diagram of an inventive device for determining a reproduction position of a source of sound.
Figure 2:
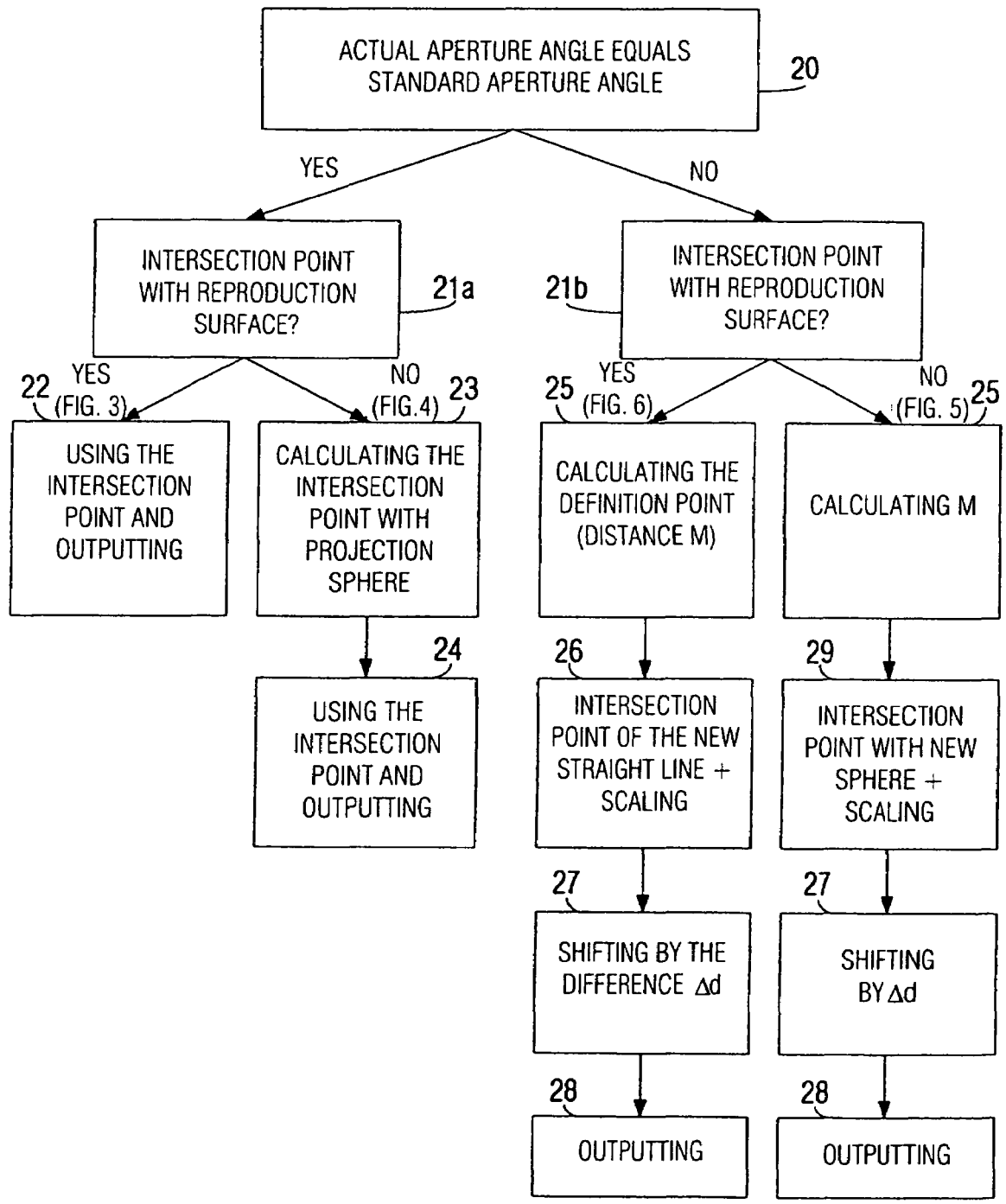
FIG. 2 is a more detailed representation of the means for calculating the reproduction position of FIG. 1.

FIG. 1 shows an overview block diagram of the inventive device for determining a reproduction position, FIG. 2 showing a more detailed representation of the means for calculating the reproduction position of FIG. 1.

In particular, the inventive device shown in FIG. 1 and/or the inventive method diagrammatically depicted in FIG. 1 serve to determine a reproduction position of a source of sound for an audio-visual reproduction of a film scene from a plurality of individual pictures or frames with regard to a reproduction surface having a predetermined width, and with regard to a projection source having a projection reference point. The reproduction surface may be, for example, a screen in a cinema. The width of the screen will vary from cinema to cinema. At any rate, however, it is predetermined, i.e. specified by the cinema in question. The projection source may be a cinema film projector, as is usually employed in cinemas or other facilities. Alternatively, the projection source may also be a so-called beamer which converts a computer-generated image directly into a projection image without the image being present, for example, as a cinema film roll. Irrespective of whether the projection source is a cinema projector or a beamer, a projection reference point may be defined for each projection source, in which projection reference point all beams which are sent from the projection source to a screen and are coincident on the screen will intersect. Accordingly, a reference point of a camera may also be defined, which may be best illustrated by approaching the camera by a model of a hole camera. The hole camera is a very simple camera without optical system, wherein a film may be illuminated via a small hole. Even for a typical camera with a complex lens system, a camera aperture may be defined in the sense that all beams which are incident in the objective at an aperture angle of the camera and which impinge upon a converter system arranged behind the objective intersect in one point, i.e. in the camera aperture. The converter system may be an un-exposed film, a CCD array or anything similar which stores incident light information and exploits it for further processing.

The inventive device initially includes means 10 for providing recording positions of sources of sound, a camera position and the aperture angle of the camera during recording. It shall be pointed out that it is preferred to store this information, i.e. the recording position of the source of sound, the camera position, and the aperture angle of the camera, for each individual picture. One should deviate from this directive only if there is no change from one picture to the next, i.e. if a series of individual pictures have the same camera position, the same soundsource position and the same aperture angle.

The positions of the sources of sound may be detected by means of a tracking system. Only in this manner is it possible that they may move in the course of a positioning, and that the position may be tracked in an automated manner. This tracking system may pass on, for each frame, the coordinates of the source of sound to the algorithm for calculating the sound-source position in relation to the camera location. Exemplary virtual studio systems allow this to be performed by means of infrared transmitters/receivers which are attached, for example, to the presenters and thus enable them to move in the virtual space, even to behind objects.

It shall be pointed out, with reference to the camera parameters, that there is data acquisition of direct tracking and data acquisition with subsequent tracking. With subsequent tracking, any points of a picture may be tracked, and the data acquired may be stored in a text file. In addition, based on this data, any camera movement performed in the real recording may be calculated from a two-dimensional picture. Same may then be exported and provided. In film production, these tools have been used to perform so called compositing, i.e. combining real pictures with computer-generated pictures.

With direct tracking, the position of the camera and the positions of the sources of sound are tracked and recorded during the picture recording. This method may be implemented in systems with pattern recognition and in sensor-based systems. Even with such systems, the tracking data may be recorded or transmitted live via a network connection. A further possibility of applying this technology, which has so far been employed only in the field of broadcasting, is utilization during the production phase of a film for previsualization on the set. Thus it is possible to provide real scenes, which are recorded before a blue screen, with a background preview as early as at the set. Thereby, the director is given the possibility of being in a better position to evaluate the effect of the scene. At the same time, the procedure of subsequently acquiring the tracking data, which sometimes involves a lot of effort, may be dispensed with.

The tracking data acquired may be faulty, depending on the method used. For example, a non-accurate calibration of the tracking system may result in dynamic offset problems. On the picture, such an error may be noticeable in that the real objects may be blurred on a virtual floor, e.g. when camera movements are performed. However, for sound production, such an error is rather negligible, since such a minimum deviation between image and sound should not be noticeable in a negative way. In addition, it may be that tracking errors cause values of some camera parameters to be assigned high-frequency interferences. With unfiltered use of the data, these interferences become noticeable by means of the source of sound vibrating. This may give rise to vibrato- and tremolo-like changes in sound. Such a fault-stricken sequence of tracking data should be low pass filtered prior to being used within the framework of data provision.

Downstream of means 10, there is means 12 for transforming the recording position of the source of sound to the camera coordinate system. The origin of the camera coordinate system is defined with regard to a camera aperture. Means 12 for transforming is operative to provide a transformation of the recording position of the source of sound to a camera coordinate system, the origin of which is defined with regard to a camera aperture, to obtain a recording position of the source of sound in the camera coordinate system.

To illustrate the transformation effected by means 12, FIG. 7 shows a comparison of the world and camera coordinate systems. In the example shown in FIG. 7, the world coordinate system is defined as a location of a blue screen 70 in the virtual studio. The origin of the world coordinate system is a point in the virtual studio which is arbitrary, but fixed, and is, in FIG. 7, the bottom left corner of blue screen 70. A source of sound at point P is designated by 72 in FIG. 7. The camera position is designated by a vector K in FIG. 7, vector K pointing at a camera origin 74. With the scenario shown in FIG. 7, both the world coordinate system and the camera coordinate system are depicted as rectangular coordinate systems, wherein a vector is specified by an x component, a y component and a z component. Alternatively, each coordinate system may also be depicted as a cylindrical coordinate system or a spherical coordinate system. Due to the simplicity of the representation, however, a Cartesian coordinate system will be assumed both for the camera coordinate system and for the world coordinate system. Means 10 is operative to provide the recording position of the source of sound 72 in the world coordinate system, i.e. vector S. Means 10 for providing is further operative to provide the camera position in the world coordinate system, i.e. vector K in FIG. 7. Lateron in the document, reference shall be made to the aperture angle of the camera.

With regard to the camera coordinate system, what is preferably specified as the origin 74 of the camera coordinate system is the so called nodal point of the camera which corresponds to the hole in the hole camera model, or, generally, to the intersection point of all rays which enter the camera's objective at an aperture angle of the camera and are then imaged onto an image converter. It shall be pointed out, however, that any other point in the camera coordinate system which is spaced away from origin 74 by a known distance might be used as a camera coordinate system reference point if the transformation from this point to the nodal point of the camera is taken into account as well.

As a basis to start from, the vector pointing to camera K (to the nodal point of the camera) as well as a vector pointing to the source of sound S at point P are available in the world coordinate system. In the first step, the source of sound vector is transformed to the camera coordinate system by means 12, as is depicted in FIG. 7 by the term "linear transformation". Here, S' is the vector of the source of sound in the camera coordinate system. S is the vector of the source of sound in the world coordinate system, and K is the vector of the camera in the world coordinate system.

It shall be pointed out here that the camera cannot only be moved translationally in the world coordinate system, but may also be "twisted" in all three directions x, y, and z in relation to the origin 74 of the camera coordinate system. Thus, a camera has three degrees of freedom of rotation. These three angles of camera alignment in space are referred to as pan, tilt and roll among those skilled in the art. By means of the rotational matrices Rx, Ry and Rz depicted beneath the figure in FIG. 7, this alignment is transferred to the source of sound vector S' in the camera coordinate system. For rotational transformation, the equation depicted on the right-hand side of FIG. 7 is thus used for creating a vector of the source of sound S" in the camera coordinate system from the vector of source of sound S', wherein the rotational alignment of the camera by x, y, and z is now taken into account.

Thus, vector S" is the vector of the source of sound in the camera coordinate system when the camera alignment is taken into account.

Downstream of means 12, there is means 14 for calculating the reproduction position of the source of sound in relation to the projection reference point, means 14 for calculating being configured to use the projection point and the camera aperture as a common starting point. In particular, the means for calculating the reproduction position is configured as is diagrammatically depicted in FIG. 2.

Once the reproduction position has been calculated by means 14, the reproduction of the source of sound in relation to the reproduction surface is output in a means 16.

The device depicted in FIG. 2 is thus operative to determine reproduction positions of sources of sound in a reproduction environment, i.e. with regard to a cinema screen, for example. Such reproduction positions may be used by a wave-field synthesis module or sound field synthesis module to achieve not only a visual three-dimensional, but also an acoustically three-dimensional reproduction of an audiovisual scene, e.g. in a cinema. In particular, an impressive field of sound may be created, with the cinema mix, by means of sound field synthesis. This may be effected, among other things, by exact positioning of virtual sources of sound in relation to the image. With subjective camera positionings, an acoustic prospective which matches the picture enables the audience to deeply immerse themselves into a scene. The mixing of such a scene with regard to positioning the loudspeakers is simplified by the inventive concept and may be automated by the individual algorithms represented by means of FIG. 2. Thus, it is "made easier" for the sound mixer to realize the concept of hearing with the ears of the camera, since it is made possible to automatically position sources of sound in dependence on a real camera positioning and depending on the position of the source of sound in the real setting. For this purpose, one operates on the basis of tracking the camera parameters, and, with moving actors, on the basis of tracking these persons.

Figure 3:
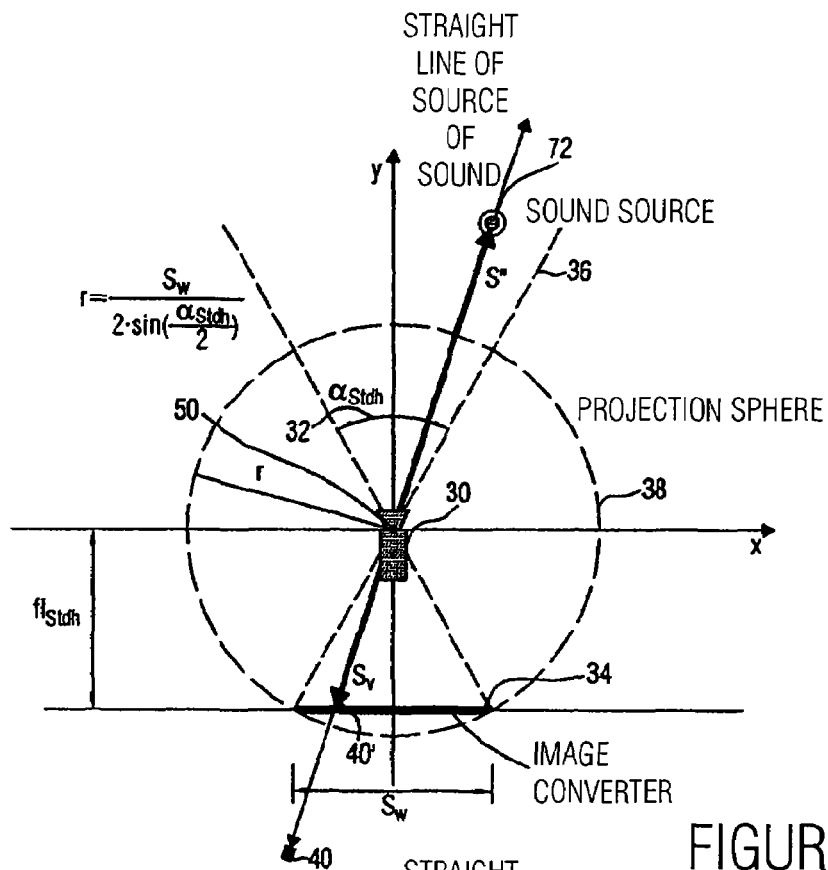
FIG. 3 is a diagrammatic representation for illustrating the calculation of the reproduction position with a standard zoom position of the camera and a source of sound within the field of view of the camera.
Figure 4:
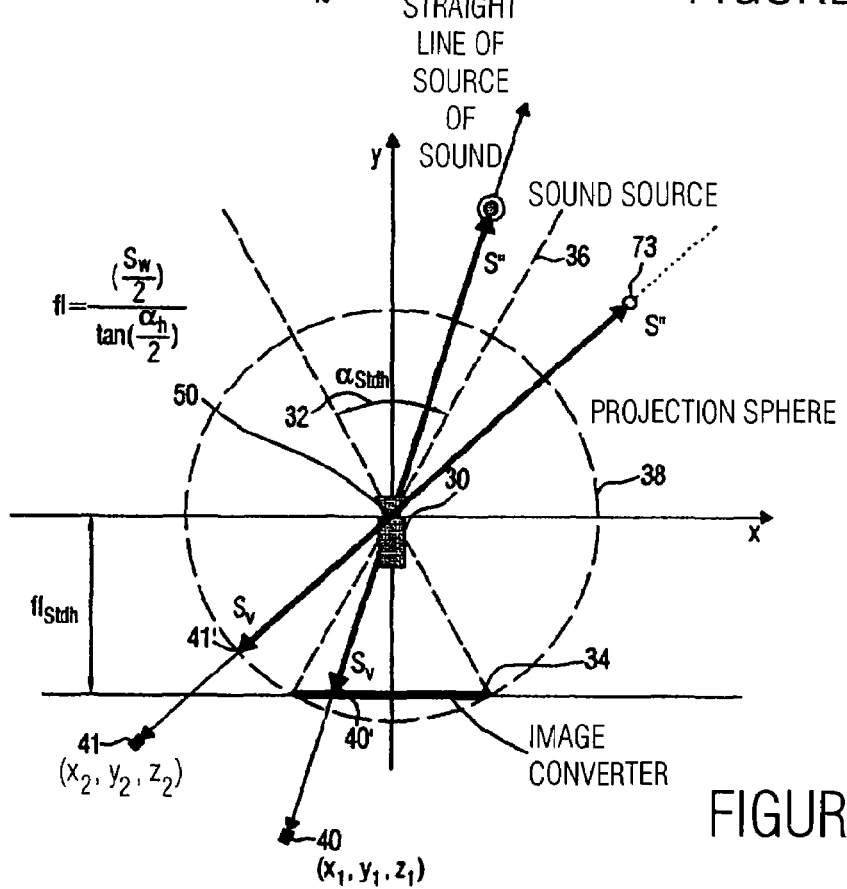
FIG. 4 is a representation similar to that of FIG. 3, wherein, additionally, a source of sound is drawn outside of the camera's field of view.
Figure 5:
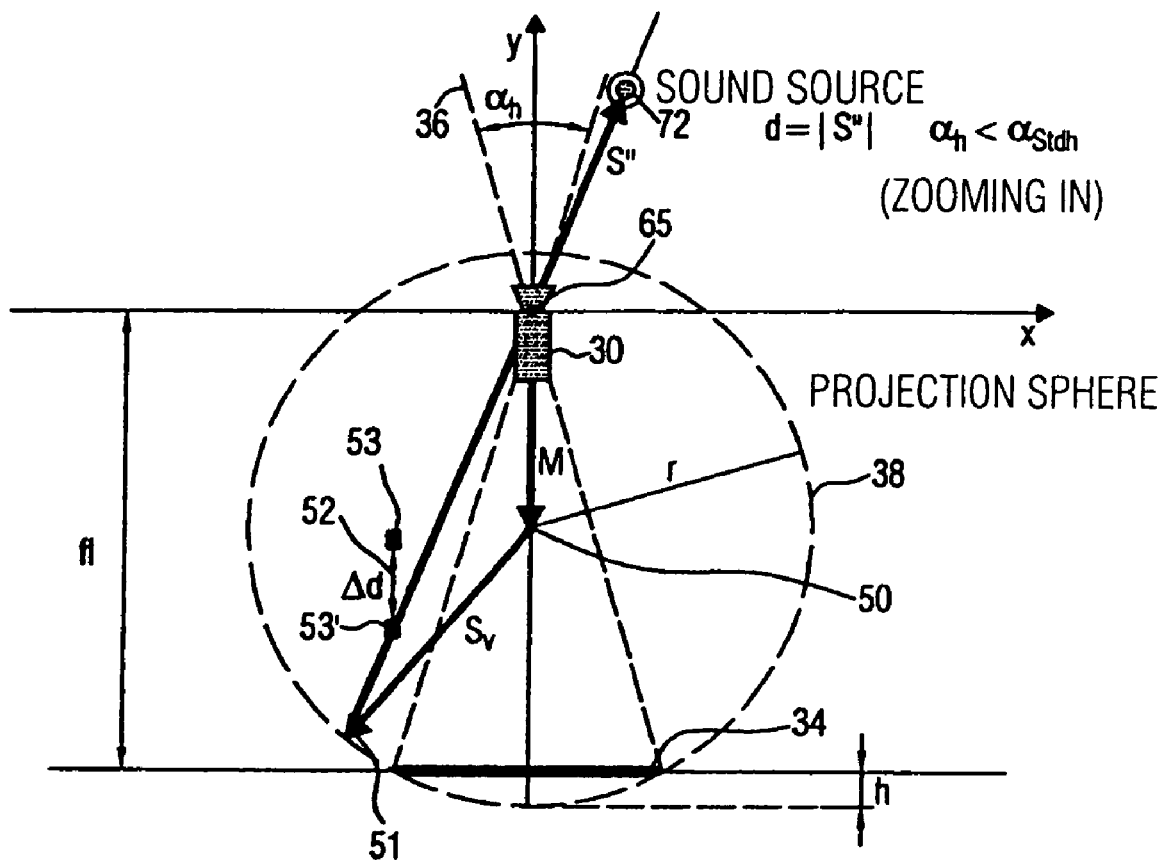
FIG. 5 is a diagrammatic representation for illustrating the calculation of the reproduction position with a zoom positioning of the camera which deviates from the standard positioning, the source of sound being located outside the camera's field of view.
Figure 6:
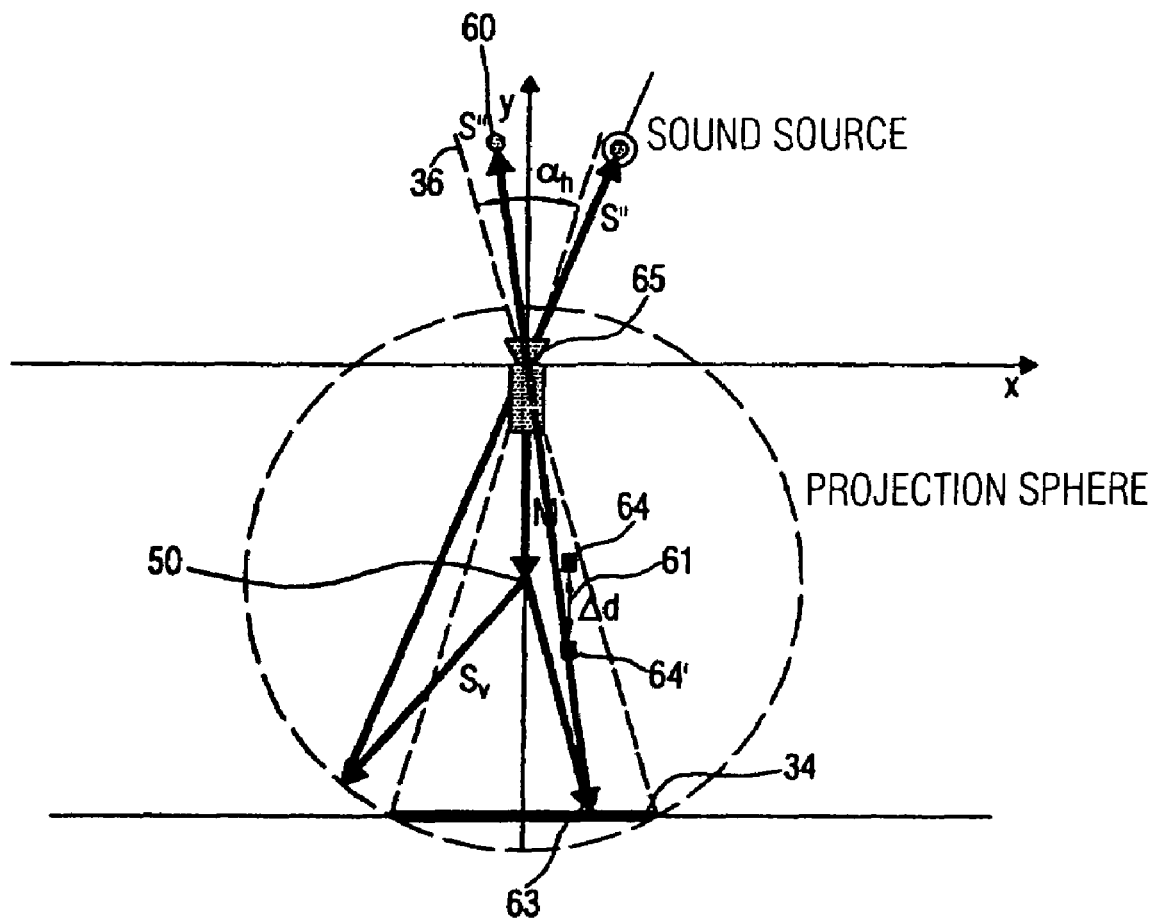
FIG. 6 is a representation similar to that of FIG. 5, wherein, in addition, a source of sound is drawn which is located in the camera's field of view.

What will be considered below with reference to FIGS. 3 and 4 is the situation wherein the aperture angle of the camera corresponds to a predetermined standard aperture angle. FIGS. 5 and 6, however, describe the case where the actual aperture angle of the camera deviates from the predetermined standard aperture angle during recording of a scene.

FIG. 3 shows a plan view of a scenario representing the real recording setting above the x axis, i.e. with positive y values, and which represents the reproduction of the scene of the real setting (with positive y coordinates) beneath the x axis, i.e. with negative y values. It shall be pointed out that the scenario shown in FIG. 3 is a three-dimensional scenario in plan view, wherein a z coordinate of z=0 is assumed for the plan view for simplicity's sake. The z axis therefore extends perpendicularly to the drawing plane in FIG. 3.

Source of sound 72 is located at a specific position in the recording setting, originally specified by the world coordinate system. The coordinate system x, y, z shown in FIG. 3 is now the camera coordinate system, however. FIG. 3 additionally depicts a combined camera/projector means 30 which is to symbolize, on the one hand, i.e. with positive y coordinates, the camera objective, and which is to represent, on the other hand, with negative y coordinates, the projector objective. The origin of the common camera coordinate system/reproduction coordinate system is referred to as 50. The vector extending from origin 50 to source of sound 72 is referred to as source of sound vector.

In the case shown in FIG. 3, the camera objective has a standard aperture angle in the horizontal direction designated by $\alpha_{stdh}$, or reference numeral 32. The-aperture angle 32 represents the "visual range" of the camera in that anything located within the horizontal aperture angle is seen by the camera, i.e. is imaged onto an image converter 34, whereas anything located outside the horizontal aperture angle 32, i.e. outside the dashed lines 36, is not imaged onto the image converter 34.

It shall be pointed out that the image converter 34 may either be interpreted, e.g., as a 35 mm film of a camera, but may just as well be interpreted as a screen in a cinema having a width extension sw of, e.g., 10 m. A projection sphere 38, the radius of which results as depicted at the top left of FIG. 3, is drawn around camera/projector means 30 for illustration reasons. Since in the embodiment shown in FIG. 3, the aperture angle of the camera equals the standard aperture angle of, e.g., the human eye, which is 27 to 28 degrees, the center of projection sphere 38 is identical with the origin of the camera coordinate system. As has been explained above, the radius of projection sphere 38 is calculated by the equation depicted at the top left of FIG. 3. Illustratively speaking, the radius is selected such that the horizontal maximum dimension of a screen in a specific cinema, the screen being referred to as $s_w$, "fits" into the sphere, so that due to the sphericity of the sphere from the screen to positive and negative z coordinates, only the corners of same "project" backward from the sphere.

Means. 14 for calculating the reproduction position is now operative to initially determine a position 40' on the screen 34, on the basis of which the reproduction position 40 for the source of sound 72 will then be calculated. To this end, a straight line of source of sound, which coincides, in the zoom setting shown in FIG. 3, with origin 50 of projection sphere 38, is constructed through point 72 and through the nodal point. It shall be pointed out that the straight line of source of sound may not only be located in the two-dimensional space, but also in the three-dimensional space, even though this may not be immediately apparent from the plan view in FIG. 3.

In the case where the standard aperture angle equals the horizontal aperture angle of the camera for the scene, the position 40 of the source of sound is specified, in accordance with the invention, by the straight line of source of sound extending through the intersection point 40' of the straight line of source of sound and of screen 34. The point 40' of intersection of the straight line of source of sound and the screen is calculated by placing a straight line extending through the location of the source of sound as well as origin 50 of the camera coordinate system, since this origin 50 corresponds to the nodal point, i.e. the intersection point of all rays, in the model of a hole camera.

$$R_S = R_{1S} + \lambda \cdot S''$$

wherein $R_{1S}$ positional vector of a point of the straight line $\lambda$ real parameter $R_{1S}$ positional vector of the current point on the straight line $$R_{1S} = \begin{pmatrix} 0 \\ 0 \\ 0 \end{pmatrix}$$

Depending on the focal length positioning of the camera, the distance between the nodal point and the image-converter plane—fl—may be calculated using the following equation.

$$fl = \frac{\left(\frac{s_w}{2}\right)}{\left(\tan\frac{\alpha_h}{2}\right)}$$

wherein fl focal length—distance of the image converter from the nodal point (in this calculation, the image converter corresponds to the normal screen)

$s_w$ width of the screen $\alpha_h$ horizontal aperture angle of the camera

Thus, the equation for the image-converter plane 34 may be established.

$$N_L \cdot (R_L - R_{1L}) = 0$$

wherein $N_L$ normal vector of the image-converter plane $R_L$ positional vector of the current point on the plane $R_{1L}$ positional vector of the image-converter plane $$N_L = \begin{pmatrix} 0 \\ 1 \\ 0 \end{pmatrix} \quad R_{1L} = \begin{pmatrix} 0 \\ -fl \\ 0 \end{pmatrix}$$

Generally, the intersection point of a straight line with a plane may be calculated as follows.

$$S_v = R_{1S} + \left(\frac{R_L \cdot (R_{1L} - R_{1S})}{N_L \cdot S''}\right) \cdot S''$$

with $$R_{1S} = \begin{pmatrix} 0 \\ 0 \\ 0 \end{pmatrix} \quad R_{1L} = \begin{pmatrix} 0 \\ -fl \\ 0 \end{pmatrix} \quad N_L = \begin{pmatrix} 0 \\ 1 \\ 0 \end{pmatrix}$$

$$S_v = R_{1S} + \left(\frac{N_L \cdot R_{1L}}{N_L \cdot S''}\right) \cdot S''$$

-continued $$S_v = \frac{-fl}{y_{S''}} \cdot S''$$

wherein $S_v$ intersection point (40) of the straight line of source of sound with the image-converter plane and/or with the projection sphere (position of the virtual source of sound without depth)

$y_{S''}$ coordinate of S"

The position of the source of sound with regard to the image converter is based on the intersection point 40' of the straight line with the image-converter plane. For the case considered here, the above equation results in the intersection point 40'.

It shall be added, with regard to the above calculation, that distance fl between the origin of the camera coordinate system and the image-converter plane 34 is also preset, on the hand, by the width of the screen and, on the other hand, by the standard aperture angle. The corresponding equation of definition is depicted at the top left in FIG. 4. If the standard aperture angle in the horizontal direction 32, i.e. $\alpha_{stdh}$, is inserted for angle α, the size $fl_{stdh}$ results for the case of the 1:1 imaging, i.e. if the aperture angle of the camera equals the aperture angle of the human visual system.

Depending on the embodiment, intersection point 40' may be taken as the reproduction position. In this case, the length of the source of sound vector, i.e. the distance of the source of sound from the camera, is not taken into account.

However, to take into account this variable as well, what is preferred is to calculate the reproduction position 40 on the basis of the intersection point 40'. To this end, vector Sv is scaled such that it has the same length as vector S". This may be effected by multiplying the length of S" and the length of Sv and subsequently multiplying the xyz coordinates of vector Sv by the ratio of the length of vector S" and the length of vector Sv. Thereby, the point designated by 40 in FIG. 3 is obtained.

Alternatively, the scaling may be made non-linear, so that the scaling factor is weighted according to its magnitude so as to reduce, e.g., relatively large distances between 40' and 40 and/or to limit the distance between 40' and 40 to a maximum value using a threshold.

Independently of the individual scaling, the intersection point 40' ensures that the direction of the source of sound to be positioned is already specified, i.e. the straight line of source of sound extending through the origin and through point 40', on which the reproduction position will eventually be specified, depending on the embodiment.

As has been set forth in connection with FIG. 3, the case depicted here is one where the source of sound 72 is located within the aperture angle 32 of the camera. With a view to the visual presentation, the situation is simple in that objects located within the aperture angle of the camera are shown on the screen, i.e. are visible, whereas objects located outside the aperture angle of the camera are not shown on the screen, i.e. are invisible. However, the case of acoustic representation is not as simple as this.

Normally, in a real setting there are sources of sound which are acoustically audible even though they are visually invisible. A simple example of this is a situation where there is a dialog between two persons, and the camera is directed at one of the two persons, but not at the other person. In this case, the one person, i.e. the one source of sound in the setting, is visible, whereas the other person, i.e. the other source of sound in the setting, is not visible.

This case is dealt with in the inventive calculation depicted, in an illustrative manner, in FIG. 4, wherein the intersection point of the straight line of source of sound extending through the source of sound 73 located outside the visual range 36 of the camera and through the nodal point of the camera with the projection sphere 38 is calculated as position 41 with coordinates $x_2$, $y_2$, $z_2$. The detailed calculation of the intersection point 41' of a straight line with a sphere is known to those skilled in the art and is not specifically set forth for the case depicted in FIG. 4, but may easily be reconstructed by means of the case shown in FIG. 5 if parameter M in FIG. 5 is set to 0, as will be set forth below.

With regard to the determination whether or not a straight line of source of sound has an intersection point with the image converter, it shall be pointed out that there are efficient algorithms for this purpose. However, another simple approach would be to assume that there is an intersection point with the image converter, and to calculate this intersection point in order to find out whether or not in the end there will be a valid result. Another approach would be to initially assume that there is no intersection point, i.e. to calculate an intersection point of the straight line with the sphere to then establish whether the y coordinate of the result obtained indicates that there is only one intersection point of the straight line of source of sound with the sphere, or that there is an intersection point 41' of the straight line of source of sound with the sphere and the screen 34, in this case the intersection point of the straight line of source of sound with the screen having priority over the intersection point of the straight line of source of sound with the projection sphere located "behind the screen".

Since the magnitude of the image converter is thus known, one may also determine whether the source of sound is imaged onto the screen. In this case, the respective coordinates may be output to the reproduction system. Otherwise it is not the coordinates 40 and 40', respectively, calculated on the basis of the screen, but coordinates 41 and 41', respectively, calculated on the basis of the sphere, that are output to the reproduction system so that a wavefield synthesis module sends corresponding phase- and amplitude-set signals to a multitude of loudspeakers to simulate, i.e. model, a virtual source of sound at the calculated positions 40 or 41.

It shall be pointed out that the same procedure as described in FIG. 3 may be used with regard to determining position 41' on the basis of intersection point 41.

It shall be pointed out here that FIGS. 3 and 4 relate to the fact that a 1:1 projection of an image onto a screen has been effected. In this case, the aperture angle of the eye equals the aperture angle of the camera, i.e. the predefined standard aperture angle $\alpha_{stdh}$, so that the angle and size ratios exactly match those of reality, i.e. those of reality as are perceived by the human eye. This means that in this case, even for sources of sound located outside the screen, the angles are imaged 1:1 in relation to the view point, as has been explained with regard to FIG. 4.

If different aperture angles, i.e. different focal lengths or zoom positionings, are used in a camera, the real ratios are represented in a distorted manner. Objects on the screen become larger or smaller than in reality. In addition, the image detail visible changes. To obtain a sound impression which is constant for the viewer's entire environment, the three-dimensional scene must be stretched or compressed in relation to the angle in the "off", i.e. outside the visible range. For this purpose, the reproduction angles for those sources of sound which are not represented on the screen are calculated by means of a projection onto a sphere, as has already been set forth with reference to FIG. 4 for the case of the predefined standard zoom positioning.

However, due to the zoom positioning of the camera, the camera aperture point for calculating the straight line of source of sound moves away from the projector by the distance illustrated by a vector M in FIG. 5. However, the radius of the projection sphere in FIG. 5 (and also in FIG. 6) is still defined by the standard aperture angle and the screen. The shift, about vector M, of the camera aperture point in relation to the projector aperture point in FIG. 5 here is identical with a change in the fl value which, in the example shown in FIG. 5, becomes larger compared to the example shown in FIG. 3 or 4, i.e. becomes larger than the value for the standard aperture angle $fl_{stdh}$.

It shall be pointed out here that the specific consideration of a zoom positioning of the camera which deviates from the standard positioning needs to be performed, since the human eye, which eventually is to view the image projected onto the screen and is to have, along with the human ear, a realistic overall impression, has no zoom function. What a camera simply achieves by changing a zoom positioning of an object may be achieved by humans only by moving toward an object or moving away from an object. If a person moves toward an object, it appears to be larger. If a person moves away from an object, it appears to be smaller. In other words, a visible source of sound, such as the mouth of a person speaking, which is zoomed in on by a camera's zoom function, also needs to "come closer" to a viewer in the cinema.

However, this is not the case, since in the cinema, the viewer is seated in a static manner and thus cannot move closer to the screen, or to the sound position previously calculated. After all, this would not make any sense, since the image on the camera becomes bigger anyhow. In accordance with the invention, care is thus taken to ensure that in the event of a deviating standard zoom positioning, a source of sound is moved toward or away from the viewer in a manner which is synchronous, as it were, to zooming a camera in or out.

It shall be pointed out that it is not only the loudness that changes in relation to the distance from a source of sound, but also the timbre of the sound. If a viewer is located very far away from a source of sound, his/her perception of the source of sound will be characterized by a lot of reverberation effects due to the surrounding room acoustics, whereas in another case, where a viewer is located very close to a source of sound, this source of sound will be perceived in a relative dry manner, i.e. in a manner which is not substantially influenced by acoustic room effects. Therefore it is not only sufficient to render sources of sound which are closer louder or quieter, but it is also desirable, for a realistic three-dimensional overall picture, to more or less eliminate room acoustics effects for sources of sound which are located closer, whereas for sources of sound which are located further away, room acoustics effects, i.e. echo effects, should rather be amplified.

Projection sphere 38 is selected such that with the standard angle (angle of the 1:1 projection), its center point M is in the nodal point of the camera, and such that the central axis of the image converter fully lies in the sphere.

The projection sphere may be described by means of the following equation.

$$(R_K - M)^2 - r^2 = 0$$

with

-continued $$M = \begin{pmatrix} 0 \\ -(fl - r + h) \\ 0 \end{pmatrix} \quad r = \frac{s_w}{2\sin(\frac{\alpha_{stdh}}{2})} \quad h = 2 \cdot r \cdot \left(\sin(\frac{\alpha_{stdh}}{4})\right)^2$$

The intersection point of a sphere with a straight line is determined by multiplying a vector, pointing to the straight line, by a constant λ. For the case described here, the equation may be simplified for λ. The equation provides two results. For this application, the value that must be selected is that which lies in that quadrant of the camera coordinate system which is opposed to the source of sound.

$$\lambda_{1/2} = \frac{1}{(S'')^2} \cdot \left((S'')^T \cdot (M - R_{1S}) \pm \sqrt{((S'')^T \cdot (M - R_{1S})^2 - (S'')^2 \cdot (R_{1S} - S'')^2 - r^2)}\right)$$

with $$R_{1S} = \begin{pmatrix} 0 \\ 0 \\ 0 \end{pmatrix}$$

$$\lambda_{1/2} = \frac{1}{(S'')^2} \cdot \left((S'')^T \cdot M \pm \sqrt{((S'')^T \cdot M)^2 - (S'')^2 \cdot ((S'')^2 - r^2)}\right)$$

$$S_v = (\lambda_{1/2} \cdot S'') - M$$

wherein

M central-point vector of the projection sphere
r radius of the projection sphere
h height
$\alpha_{stdh}$ horizontal standard aperture angle
$R_K$ positional vector of a current point on the sphere The vector pointing to the intersection point between the straight line of source of sound and the sphere may be calculated for $S_v$ in accordance with the previous equation. With varying focal length positionings of the camera, the sphere is shifted in a manner which is analogous to the image-converter plane. However, the reference point for calculating the new sound-source vector for reproduction is always the central point of the sphere. Therefore, the central-point vector is subtracted.

By means of the above calculation, vector $S_v$ is thus calculated, to be precise, in the case shown in FIG. 5, as intersection point 51 with the projection sphere. This results in a vector pointing from the origin of camera 30 to the intersection point 51 of the straight line of source of sound extending through the source of sound and the origin of the camera as an addition of vectors M and $S_v$. If one selects the case M=0, in the calculation depicted in FIG. 5 and described above, value M is set M=0 to achieve the case of FIG. 4, i.e. the case where the source of sound is located outside the visual range 36 of the camera and images onto the projection sphere 38 outside the screen, i.e. at position 41.

The previous calculation of the imaging of the source of sound 72 in FIG. 5 to the projection sphere 38 now indicates the angle of the source of sound 72 in relation to the reference point, i.e. the central point 50. However, what is not taken into account yet is the length of the sound-source vector S" and the effect that the source of sound moves closer to the viewer, or further away from same, depending on whether a scene has been zoomed in on or zoomed out of.

Once the angle of the source of sound in relation to the reference point has been determined to be an auxiliary point 51, scaling may also be performed to obtain point 53', starting from which the distance of the source of sound will be modeled, in accordance with an embodiment of the invention, with the image impression seen.

The calculation of the difference 52 in FIG. 5 is based on the consideration that the human optical system has no variable focal length. The consequence of this is that an enlarged representation of objects on a screen makes believe, to human perception, a change in the distance, an approximation, and thus a change of the location of the viewing point. This means that as the aperture angle of the camera is reduced in size, an object recorded is enlarged. Thus, the corresponding source of sound is to move closer to a viewer.

To calculate the new distance, the standard angle is used as the basis in accordance with the invention. An object located at a specified distance and having size 1 is determined, in the case of the standard angle, in its imaging size on the screen. Now the imaging size at the zoom set is viewed, and the "virtual camera" 30 in FIG. 5 is shifted until the imaging size again corresponds to that obtained at the standard angle. The source of sound is shifted by this change in distance, which results in the new distance. For sources located behind the camera, this leads to a behavior where they move away from the camera during zooming in.

This effect is taken into account by the difference Δd 52 in FIG. 5, which is calculated such as is depicted by the equation at the bottom right in FIG. 5. In mathematical terms, the following equation thus describes this shift by the difference of Δd. Same must then be applied to the reproduction vector (i.e., in FIG. 5, to that vector directed from reference point 65 at point 53') so as to obtain point 53:

$$\Delta d = d \cdot \left(1 - \frac{fl_{stdh}}{fl}\right)$$

wherein
Δd change in distance for the virtual source of sound
d distance of the real source of sound (length of S")
$fl_{stdh}$ focal length at the standard aperture angle
fl focal length at the current aperture angle of the camera FIG. 6 shows the case which is similar to FIG. 5, but now for a source of sound 60 which is located, despite zooming in on a scene, within the field of view, defined by the dashed lines 36, of the camera. By analogy with FIG. 3, the intersection point 63 of the straight line of source of sound, defined by S" and the aperture angle of the camera, with the screen 34 is calculated to initially achieve an angular imaging. The angular imaging provides point 63 on screen 34.

With one embodiment, this is followed by scaling on the basis of the lengths of the vectors, as has been described with reference to FIG. 3. By means of this scaling, point 64' is obtained. To obtain the eventual reproduction position 64 of the source of sound, this point 64' is shifted in the direction toward the x axis by the difference Δd 61.

It shall be pointed out here that the shift by Δd 52 or 61 may be implemented in an alternative manner in FIGS. 5 and 6. Thus, with reference to FIG. 6, the shift Δd 61 may also be applied to the real source of sound in the camera coordinate system, i.e. point 60. Subsequently, the new length of the resulting vector S" is calculated. On the basis of this length, vector Sv is then scaled (vector Sv is given, for example, exactly the same length as S"), so that what results for the reproduction position is a point which deviates from point 64 in FIG. 6. Depending on the embodiment, the shift by Δd, shown with reference to FIG. 5, may also be implemented for the source of sound located outside the "field of view", i.e. for the case in FIG. 5, and for the case of FIG. 6, i.e. for the case of the source of sound located in the field of view, the above-described, deviating calculation and/or application of the shift to S" may be used. For both cases of FIGS. 5 and 6, this procedure may also be interchanged as long as an angle deviating from the standard aperture angle is taken into account by performing a shift by the difference Δd in relation to the reproduction surface 34.

Subsequently, an overview will be given, with reference to FIG. 2, of the different case distinctions which result in a combined case distinction in that a distinction is initially made, in a block 20, whether or not the actual aperture angle of the camera, i.e. $\alpha_h$, equals the standard aperture angle $\alpha_{stdh}$. If this question is answered in the positive, FIGS. 3 and 4 are relevant.

To differentiate which of FIGS. 3 and 4 is relevant, a further decision is made as to whether or not the intersection point of the straight line of source of sound with the reproduction surface exists (21a). If this question is answered in the positive, the reproduction position 40 may be calculated and output (22) immediately on the basis of this intersection point 40', as has been represented with reference to FIG. 3. That means, if the aperture angle of the camera equals the predetermined aperture angle, the reproduction position (40 or 40') is determined and output on the basis of the intersection point 40' between the straight line extending through the recording position 72 of the source of sound in the camera coordinate system and through the common starting point of camera 30, i.e. through the central point of projection sphere 38 and reproduction surface 34.

If the question of block 21a is answered in the negative, however, the reproduction position is calculated and output on the basis of the intersection point 41' between the straight line of source of sound, determined by the recording position 73 of a source of sound in the camera coordinate system and the nodal point of the camera, and projection sphere 38 (blocks 23 and 24). It shall be pointed out that in all cases, radius r of projection sphere 38 depends on the width of the image converter 34, designated by $s_w$, and the predetermined aperture angle $\alpha_{stdh}$, as may be seen, in particular, from the equation situated at the top left in FIG. 3.

However, if in block 20 a determination is made that the actual aperture angle does not equal the standard aperture angle, i.e. if the question in block 20 is answered by "no", a determination is again made in a block 21b whether or not the straight line of source of sound has an intersection point with the reproduction surface 34.

If this question is answered in the negative, FIG. 5 will be relevant. If this question is answered in the positive, on the other hand, FIG. 6 will be relevant.

In accordance with the invention, in the case where the question in block 21b is answered in the positive (FIG. 6), an intersection point 63 between a straight line extending through the recording position of the source of sound 60 in the camera coordinate 'system and a definition point 65, spaced away by a distance M from the common starting point, and the reproduction surface 34 will be calculated in accordance with the invention. If need be, this value will be scaled (point 64') and subsequently shifted by a difference 61 to calculate the reproduction position 64, both the distance M and the difference 61 depending on the aperture angle $\alpha_h$ of the camera. In particular, distance M will therefore be initially calculated (block 25). Subsequently, the intersection point 63 of the straight line of source of sound, extending through the definition point 65, with the image converter 34 is calculated, this intersection point being designated by 63 in FIG. 6 (block 26).

Scaling is then performed on the basis of this intersection point 63 so as to obtain point 64' which is then shifted in a negative y direction by the difference Δd, designated by 61 in FIG. 6, since the sign of Δd is negative (block 27). This point 64 is then output, in a block 28, as a reproduction position of the source of sound in the reproduction setting, such as in a cinema.

If, on the other hand, the question in block 21b is answered in the negative, FIG. 5 will be relevant. Initially, the distance M will be calculated again so as to calculate the straight line of source of sound extending through the source of sound 72 and the definition point 65, which is shifted in the positive y direction from the central point 50 of the projection sphere by the distance M. As is indicated in a block 29, intersection point 51 of the straight line of source of sound with the projection sphere 38, which point is designated by 51 in FIG. 5, will be subsequently calculated. This intersection point 51 is scaled by analogy with block 27 to obtain point 53' which is then shifted in the positive y direction by the difference Δd, designated by 52 in FIG. 5 (block 27) so as to eventually obtain and output position 53 of source of sound 72 (block 28).

It shall be pointed out that the sequence of calculating distance M, of calculating an intersection point, of scaling and of shifting the intersection point by Δd, the sequence being depicted in FIG. 2, may typically be implemented using a single equation. With a processor-based implementation, e.g. within a DSP, this equation may naturally be implemented in a step-wise manner, as is shown in FIG. 2. However, the equation may also be calculated "in one go" without requiring intermediate storage of intermediate results in a DSP.

It shall be pointed out here that distance M in FIGS. 5 and 6 leads to the fact that the aperture point of the camera, which coincided with the origin of the camera coordinate system in FIGS. 3 and 4, is spaced away from the central point 50 of projection sphere 38 due to the distance M being non-zero, the aperture point of the camera, which is spaced away from the central point 50 of projection sphere 38 by the distance M which is non-zero. This point is depicted, in FIGS. 5 and 6, as a reference point 65 which in this case defines, along with sources of sound 72 and 60, respectively, the corresponding straight line of source of sound, the intersection points of which with the screen 34 and projection sphere 38, respectively, reproduces the reproduction positions 40 and 64, respectively, for a specific zoom positioning deviating from the standard zoom positioning, while taking into account the scaling and shifting by the differences 52 and 61, respectively.

While the source of sound line thus passes through the common starting point in FIGS. 3 and 4, i.e. with a standard angle-of-aperture positioning, the straight line of source of sound passes through the reference point with a different zoom positioning, i.e. when considering FIGS. 5 and 6, the reference point being shifted by the distance M from the common starting point in the positive y direction for an enlarged zoom positioning, or in the negative y direction for a wide-angle positioning.

The above calculations summarized with reference to FIG. 2 to obtain a reproduction position of a source of sound in a cinema setting may be calculated individually for each cinema. However, it is preferred, according to the invention, to relate the image formations to a normal screen width of, for example, 2 m. This results in reproduction positions of sources of sound for a reproduction room wherein the reproduction surface has a width of 2 m. The position coordinates obtained, e.g. in x, y and z, may then simply be scaled for translation into a different reproduction scenario wherein the width of the reproduction surface differs from 2 m. If the width of the reproduction surface is, e.g., smaller than the normal reproduction surface, the reproduction positions obtained may readily be scaled by the ratio of the normal width to the real width. In the case where the real width is, e.g., only 1 m, all coordinate values must be halved. In the case where the real reproduction width is, e.g., 10 m, however, all coordinates must be multiplied by the factor of 5.

This approach has the advantage that the reproduction positions may be calculated in advance and that in an actual cinema, only scalings need to be performed without a need to perform the full calculations depicted in FIG. 2.

This has the advantage that scaling to real cinema situations is performed in a quick and reliable manner without the sound mixer having to deal with fully calculating the reproduction positions, for example in said cinema.

The inventive concept is thus based on the differentiation as to whether or not the source of sound is located on the normal screen. If the source of sound is located on the normal screen, a calculation is conducted on the basis of FIGS. 3 and 6, namely using a calculation of a fictitious array optics and by calculating a so-called leaking-camera model. This is to determine the intersection point between the spot beam and the screen.

If the source of sound is not located on the norm screen, a determination of the intersection point between a straight line, i.e. the straight line of source of sound, and the projection sphere is conducted. The source of sound position and, consequently, an angle, result from this intersection point. The projection sphere is shifted in relation to its central point, as may be seen in FIGS. 5 and 6, in dependence on the camera zoom positioning. In particular, the central point of the sphere is identical to the nodal point of the camera for the normal zoom positioning. In this case, the angles may be reproduced exactly as they were in the real camera recording situation. This case was depicted by FIGS. 3 and 4.

In the case of a tele position, i.e. of zooming in, the distance between the viewer and the source of sound will decrease, as is shown, by way of example, at 61 in FIG. 6, whereas in the case of a wide-angle positioning, i.e. in a larger aperture angle than the aperture angle of the human eye, the distance between the viewer and the source of sound will increase. In the cases of FIGS. 5 and 6, the source of sound would therefore be shifted by Δd to behind the screen from its position, in relation to the central point of the projection sphere. Along with the angle determined by the straight line of source of sound, this distance results in the source of sound being positioned as a virtual source of sound in the reproduction setting. The result is that a viewer not only gets a visual three-dimensional impression, but also an audio-implemented three-dimensional impression matching the visual impression.

Figure 8:
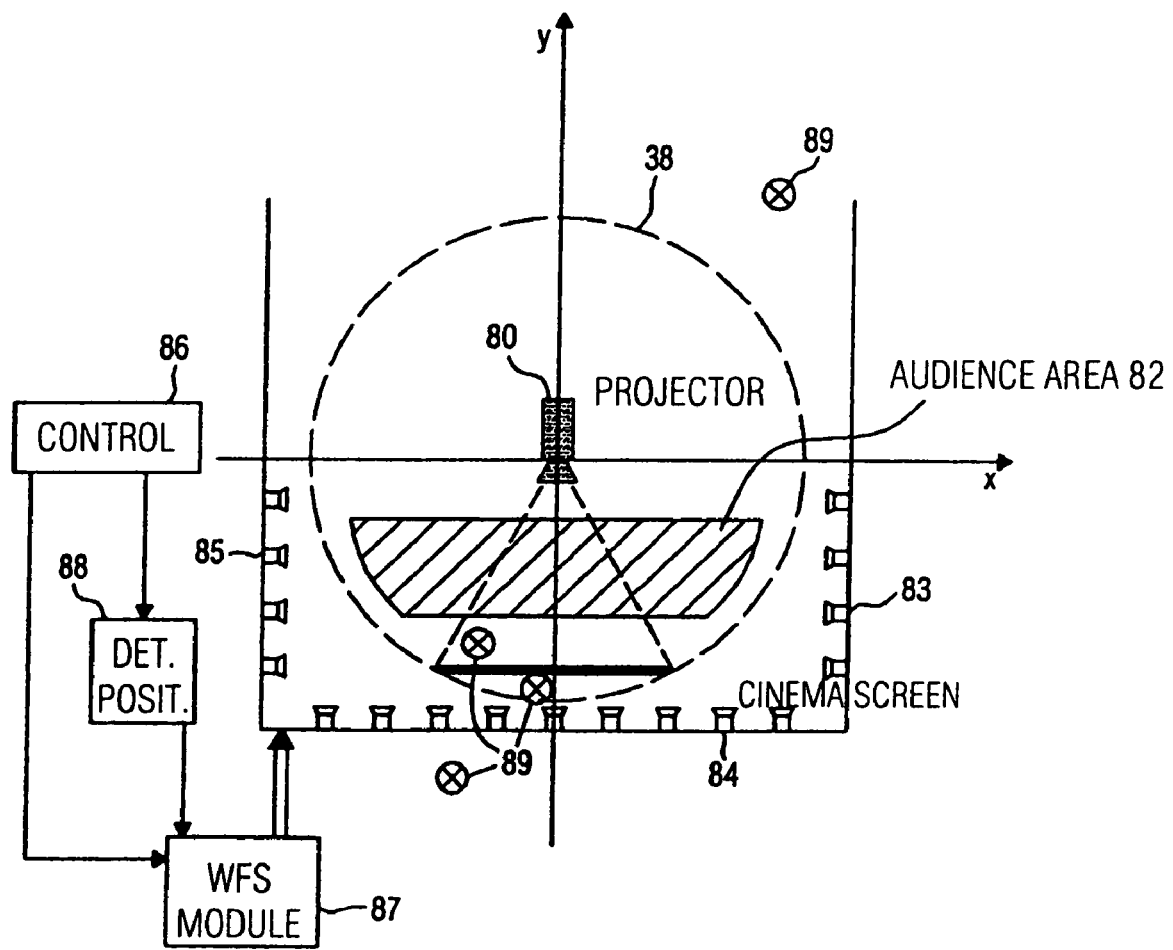
FIG. 8 is a diagrammatic representation of a reproduction room having a film projector and an array of loudspeakers for reconstructing virtual sources of sound in the reproduction room using wave-field synthesis.

Subsequently, a real cinema setting will be depicted with reference to FIG. 8, wherein projection sphere 38 is again depicted for illustration reasons and for the sake of comparison with FIGS. 3, 4, 5 and 6. In the cinema, there are a cinema projector 80 and an audience area 82. For purposes of wavefield synthesis, loudspeaker arrays 83, 84, 85 are also depicted in the cinema, which extend on three sides of the cinema in the example shown in FIG. 8. For improved illustration, it is preferred to mount a loudspeaker array behind the projector as well. Projector 80 is controlled by an overall control 86 which additionally controls a wavefield synthesis module 87. The wave-field synthesis module 87 obtains the positions of the virtual sources of sound from a position determination means 88, which is also controlled by control 86. The virtual sources of sound are designated by 89 in FIG.

8. It may be seen from FIG. 8 that virtual sources of sound may be placed before the screen, behind the screen, even outside the cinema and, in particular, before or behind the audience area 82. Depending on the placement, the wavefield synthesis module 87 generates corresponding amplitude- and phase-adapted signals for the individual loudspeakers of arrays 83, 84, 85. The superposition of the sound waves radiated by the individual loudspeakers then leads to the fact that a viewer positioned in the audience area 82 who receives a superposition of all sound waves of all loudspeakers by means of his/her ears, gets the impression that the sound comes from a virtual source of sound at one of positions 89.

Depending on the circumstances, the inventive method for determining a reproduction position may be implemented in hardware or in software. The implementation may be effected on a digital storage medium, in particular a disc or CD with control signals which may be read out electronically and which may interact with a programmable computer system such that the method is performed. Generally, the invention thus also consists in a computer program product with a program code, stored on a machine-readable carrier, for performing the inventive method when the computer program product runs on a computer. In other words, the invention may thus also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for determining a reproduction position of a source of sound for audio-visual reproduction of a film scene from a plurality of individual pictures with regard to a reproduction surface having a predetermined width and a projection source having a projection reference point, the device comprising:

a provider configured for providing a recording position of the source of sound, a camera position during recording, and an aperture angle of the camera during recording;

a transformer configured for transforming the recording position of the source of sound to a camera coordinate system, the origin of which is defined, in relation to a camera aperture, to obtain a recording position of the source of sound in the camera coordinate system;

a calculator configured for calculating the reproduction position of the source of sound in relation to the projection reference point, the calculator being configured to use the projection reference point and the camera aperture as a common starting point, and the calculator being configured, in the case of an aperture angle of the camera which equals a predetermined aperture angle, to calculate the reproduction position on the basis of an intersection point between a straight line extending through the recording position of the source of sound in the camera coordinate system and through the common starting point and the reproduction surface, or if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference.

2. The device as claimed in claim 1, wherein the projection point corresponds to an aperture of a film projector or to an equivalent point of a beamer, in which light rays which have been output intersect.

3. The device as claimed in claim 1, wherein the camera aperture is a point which corresponds to a hole of a hole camera by means of which the camera may be modeled.

4. The device as claimed in claim 1, wherein the predetermined aperture angle is an aperture angle in a normal positioning based on a mean aperture angle of viewers of the reproduction surface.

5. The device as claimed in claim 1, wherein the predetermined aperture angle is an aperture angle of the human eye and is about 27 degrees.

6. The device as claimed in claim 1, wherein the reproduction surface is a cinema screen spaced away from a film projector or beamer by a predetermined distance.

7. The device as claimed in claim 1, wherein information about the recording position of the source of sound and the camera position during recording is associated with each individual picture, the information relating to a world coordinate system having its origin at a point of a real recording set or at a point in a virtual studio.

8. The device as claimed in claim 1, wherein the transformer is configured to take into account, in addition to the camera position, one or several rotations about axes of the camera coordinate system.

9. The device as claimed in claim 8, wherein the radius of the projection sphere is specified as follows:

$r = s_w / (2 \cdot \sin(\alpha_{stdh}/2))$, wherein r is the radius of the projection sphere, wherein $s_w$ is a width of the reproduction surface, wherein $\alpha_{stdh}$ is the predetermined aperture angle, and wherein sin represents a sinus function.

10. The device as claimed in claim 1, wherein the distance extends perpendicularly to the reproduction surface and is specified by the following equation:

$$M = -(fl - r + h),$$

wherein M is the distance, wherein fl is a distance between the reference point and the reproduction surface, and wherein h is located between the projection sphere and the reproduction surface in an area of the projection sphere which is arranged behind the reproduction screen in relation to the reference point.

11. The device as claimed in claim 10, wherein the distance is given by the following equation:

$$fl = s_w/(2\tan(\alpha_h/2)),$$

wherein $s_w$ is a width of the reproduction surface,
wherein $\alpha_h$ is an aperture angle of the camera, and
wherein tan represents a tangent function.

12. The device as claimed in claim 11, wherein a shift may be conducted by the difference in parallel with the deviation by the distance.

13. The device as claimed in claim 12, wherein the difference may be determined depending on a sign of the deviation of the camera's aperture angle from the standard aperture angle.

14. The device as claimed in claim 1, wherein in the case of a current aperture angle of the camera which is smaller than the predetermined aperture angle, the difference is positive, and wherein in another case, where a current aperture angle is larger than the predetermined aperture angle, the difference is negative, so that a distance of the source of sound from a viewer decreases if the difference is positive, and so that a distance of the source of sound from the viewer increases if the difference is negative.

15. The device as claimed in claim 1, wherein the difference is specified by the following equation:

$$\Delta d = d \cdot (1 - fl_{std}/fl),$$

wherein $\Delta d$ is the difference,
wherein d is a distance between the source of sound in the camera coordinate system and the reference point,
wherein $fl_{std}$ d is a distance between the common starting point and the reproduction surface, and
wherein fl is a distance between the reference point and the reproduction surface.

16. The device as claimed in claim 1, which is configured to calculate the reproduction position of a source of sound with a normal width of the reproduction surface, and which is further configured to scale the reproduction position for a reproduction under real circumstances in dependence on a ratio of the normal width of the reproduction surface and a real width of a reproduction surface.

17. The device as claimed in claim 1, wherein the calculator is configured to scale a vector pointing to an intersection point using a length of a vector pointing to the sound-source position to obtain the reproduction position, or a starting point for the shift.

18. The device as claimed in claim 17, wherein the calculator is configured to scale the vector with a scaling factor which equals a length of the vector pointing to the sound-source position, divided by the length of the vector itself.

19. The device as claimed in claim 17, wherein the calculator is configured to scale a distance between the intersection point and the reproduction position and/or the starting point for the shift in a non-linear manner in relation to the length of the vector pointing to the sound-source position, and/or to limit same to a maximum distance.

20. A method for determining a reproduction position of a source of sound for audio-visual reproduction of a film scene from a plurality of individual pictures with regard to a reproduction surface having a predetermined width and a projection source having a projection reference point, the method comprising:

providing a recording position of the source of sound, a camera position during recording, and an aperture angle of the camera during recording to a hardware apparatus;
transforming, using the hardware apparatus, the recording position of the source of sound to a camera coordinate system, the origin of which is defined, in relation to a camera aperture, to obtain a recording position of the source of sound in the camera coordinate system;
calculating, using the hardware apparatus, the reproduction position of the source of sound in relation to the projection reference point, the calculator being configured to use the projection reference point and the camera aperture as a common starting point, and the calculator operating,
in the case of an aperture angle of the camera which equals a predetermined aperture angle,
to calculate the reproduction position on the basis of an intersection point between a straight line extending through the recording position of the source of sound in the camera coordinate system and through the common starting point and the reproduction surface, or
if no such intersection point exists, to calculate the reproduction position on the basis of an intersection point of the straight line with a projection sphere, the central point of which is the common starting point, and the radius of which depends on the width of the reproduction surface and the predetermined aperture angle, or
in the case of an aperture angle of the camera which deviates from the predetermined aperture angle,
to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or
if no such intersection point exists, to calculate the reproduction position on the basis of an intersection point of the straight line with a projection sphere, the central point of which equals the common starting point, and on the basis of a shift by the difference.

21. A digital storage medium having stored thereon a computer program having a program code for performing a method for determining a reproduction position of a source of sound for audio-visual reproduction of a film scene from a plurality of individual pictures with regard to a reproduction surface having a predetermined width and a projection source having a projection reference point, the method comprising:

providing a recording position of the source of sound, a camera position during recording, and an aperture angle of the camera during recording;
transforming the recording position of the source of sound to a camera coordinate system, the origin of which is defined, in relation to a camera aperture, to obtain a recording position of the source of sound in the camera coordinate system;
calculating the reproduction position of the source of sound in relation to the projection reference point, the calculator being configured to use the projection reference point and the camera aperture as a common starting point, and the calculator being configured,
in the case of an aperture angle of the camera which equals a predetermined aperture angle,
to calculate the reproduction position on the basis of an intersection point between a straight line extending through the recording position of the source of sound in the camera coordinate system and through the common starting point and the reproduction surface, or
if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference, when the program runs on a computer.

22. A device for reproducing, on a reproduction surface, a film scene having a plurality of individual pictures, comprising:

a provider configured for providing a reproduction position of a source of sound for audio-visual reproduction of a film scene from a plurality of individual pictures with regard to a reproduction surface having a predetermined width and a projection source having a projection reference point, the device including:

a provider configured for providing a recording position of the source of sound, a camera position during recording, and an aperture angle of the camera during recording;

a transformer configured for transforming the recording position of the source of sound to a camera coordinate system, the origin of which is defined, in relation to a camera aperture, to obtain a recording position of the source of sound in the camera coordinate system;

a calculator configured for calculating the reproduction position of the source of sound in relation to the projection reference point, the calculator being configured to use the projection reference point and the camera aperture as a common starting point, and the calculator being configured, in the case of an aperture angle of the camera which equals a predetermined aperture angle, to calculate the reproduction position on the basis of an intersection point between a straight line extending through the recording position of the source of sound in the camera coordinate system and through the common starting point and the reproduction surface, or if no such intersection point exists, to calculate the reproduction position on the basis of an intersection point of the straight line with a projection sphere, the central point of which is the common starting point, and the radius of which depends on the width of the reproduction surface and the predetermined aperture angle, or in the case of an aperture angle of the camera which deviates from the predetermined aperture angle, to calculate the reproduction position on the basis of an intersection point between a straight line extending through the recording position and the source of sound in the camera coordinate system and a reference point, spaced away from the common starting point by a distance, and the reproduction surface, and on the basis of a shift by a difference in relation to the reproduction surface, the distance and the difference depending on the aperture angle of the camera, or if no such intersection point exists, to calculate the reproduction position on the basis of an intersection point of the straight line with a projection sphere, the central point of which equals the common starting point, and on the basis of a shift by the difference, a wave-field synthesis generator for generating control signals for one or several loudspeaker arrays to simulate a virtual reproduction position of the source of sound for a viewer positioned in an audience area.

* * * * *